July 31, 1934.　　　G. G. POWERS ET AL　　　1,968,802
METHOD AND MACHINE FOR PRODUCING SPRINGS
Filed Aug. 7, 1933　　　6 Sheets-Sheet 1

Inventors:
George G. Powers
and Clarence A. Rhinevault

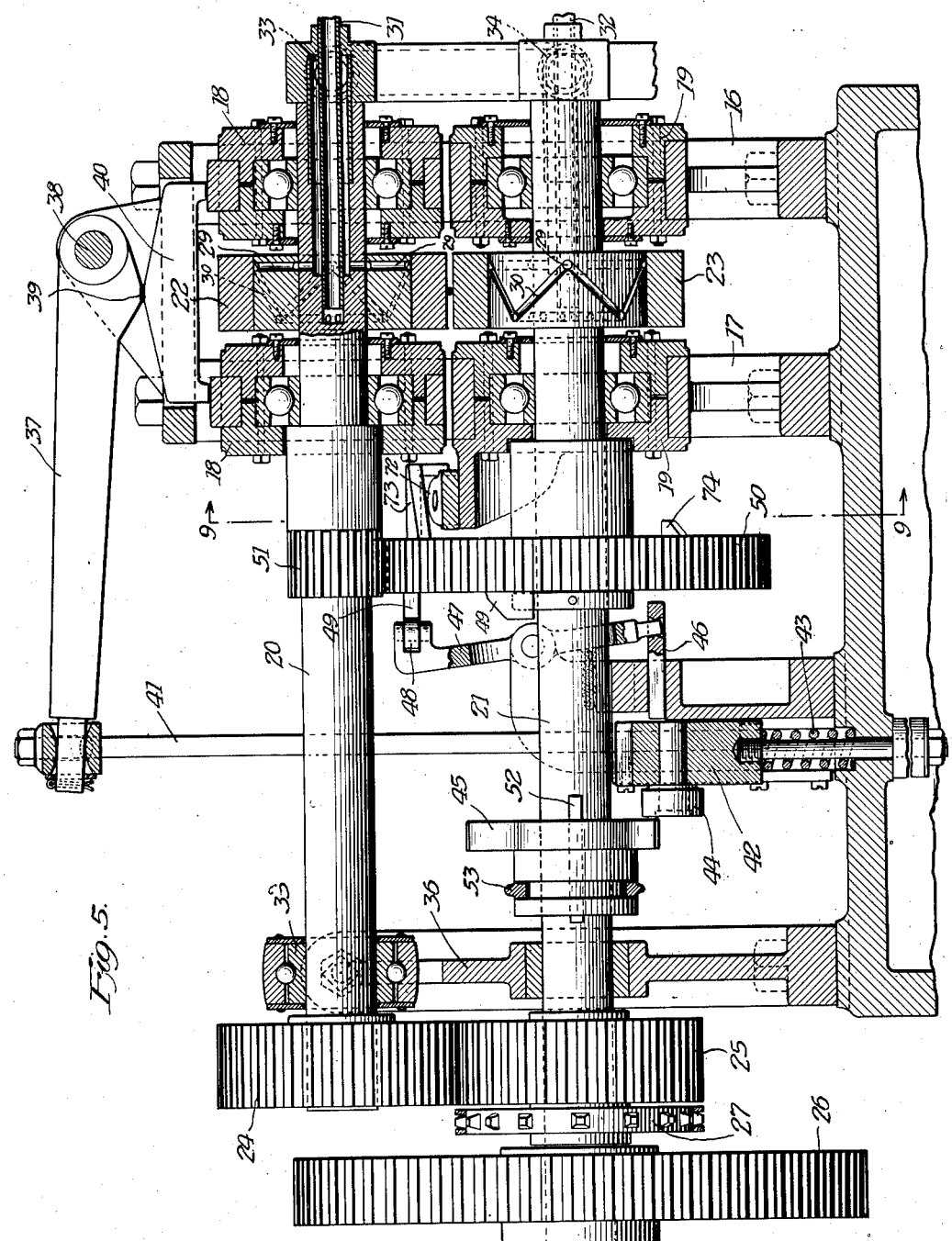

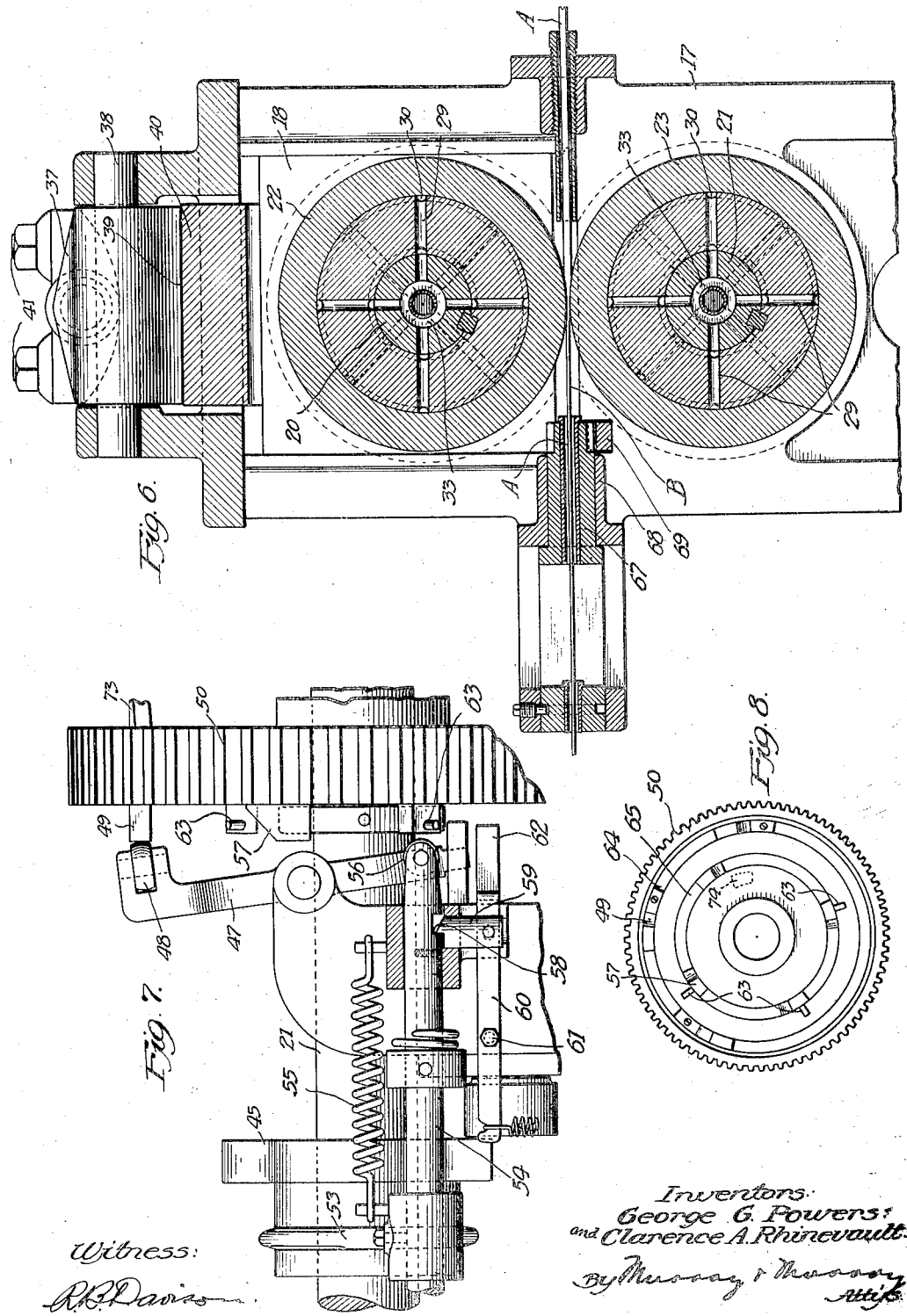

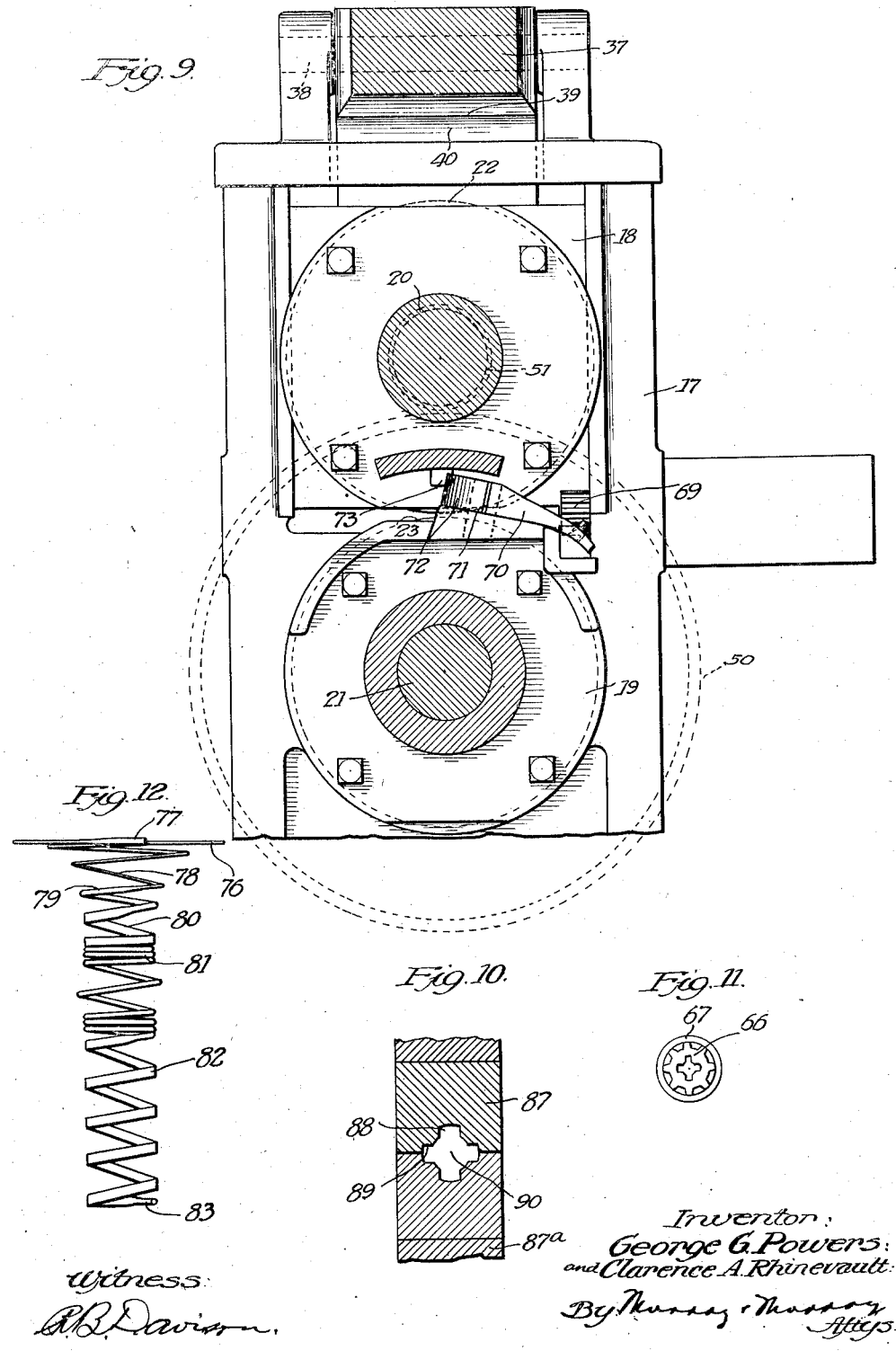

Patented July 31, 1934

1,968,802

UNITED STATES PATENT OFFICE 1,968,802

METHOD AND MACHINE FOR PRODUCING SPRINGS

George G. Powers and Clarence A. Rhinevault, Chicago, Ill., assignors, by direct and mesne assignments, to The Powers Spring Corporation, Chicago, Ill., a corporation of Illinois Application August 7, 1933, Serial No. 684,092

19 Claims. (Cl. 140—79)

Our invention relates to springs, and particularly to a machine by means of which spring wire, round in cross section, is delivered, rolled to a flat cross section in different planes at different points in the length of the wire composing the spring, then delivered to a coiler and wound into a spring of the desired contour, all in a continuous operation.

An object of our invention is to provide a machine that will automatically in a series of continuous operations produce spring of the type disclosed in the co-pending application of George G. Powers, Serial No. 644,254, filed November 25, 1932.

This spring is composed of a length of wire that has been flattened throughout at least a portion of its length, with the flattened portion arranged in two or more planes and with the ends remaining round to facilitate tying. Such a spring possesses many advantages in use and may be designed in such manner as to produce a spring having a specified stiffness, either lateral or vertical without increasing the size or weight of the wire used in making the spring. For example, if considerable lateral stiffness is required, the spring may be constructed with the flat portion in a horizontal plane, or, if increased vertical stiffness is needed the body of the spring may be constructed with the flat in a vertical plane, or the top may be made with the wire in a horizontal plane to provide a flat, even surface for the support of a pad or cover and to provide lateral stiffness, while all or a portion of the body of the spring may be constructed with the flat wire in a vertical plane; or all or a portion of the body may be constructed of round wire and the remainder of flat wire in a vertical or horizontal plane. The machine under consideration is adapted for the production of springs in any of the suggested or other desired forms.

The invention will be more readily understood by reference to the accompanying drawings, in which:

Fig. 5 is a longitudinal sectional view on the line 5—5 of Fig. 1;

Fig. 6 is a view taken on the line 6—6 of Fig. 1;

Fig. 7 is an enlarged fragmentary view of the construction shown in the middle portion of the machine shown in Fig. 5;

Fig. 8 is a face view of the cam that performs many of the operations;

Fig. 9 is a view taken on the line 9—9 of Fig. 5;

Fig. 10 is a fragmentary sectional view through the guide rolls on the coiler;

Fig. 11 is a detail view of the twister connected to the roller;

Fig. 12 is a view of a specimen spring adapted to be produced on the machine, and Fig. 13 is a fragmentary view of a coiler cam, the view being taken on the line 13—13 of Fig. 1.

Figure 1:
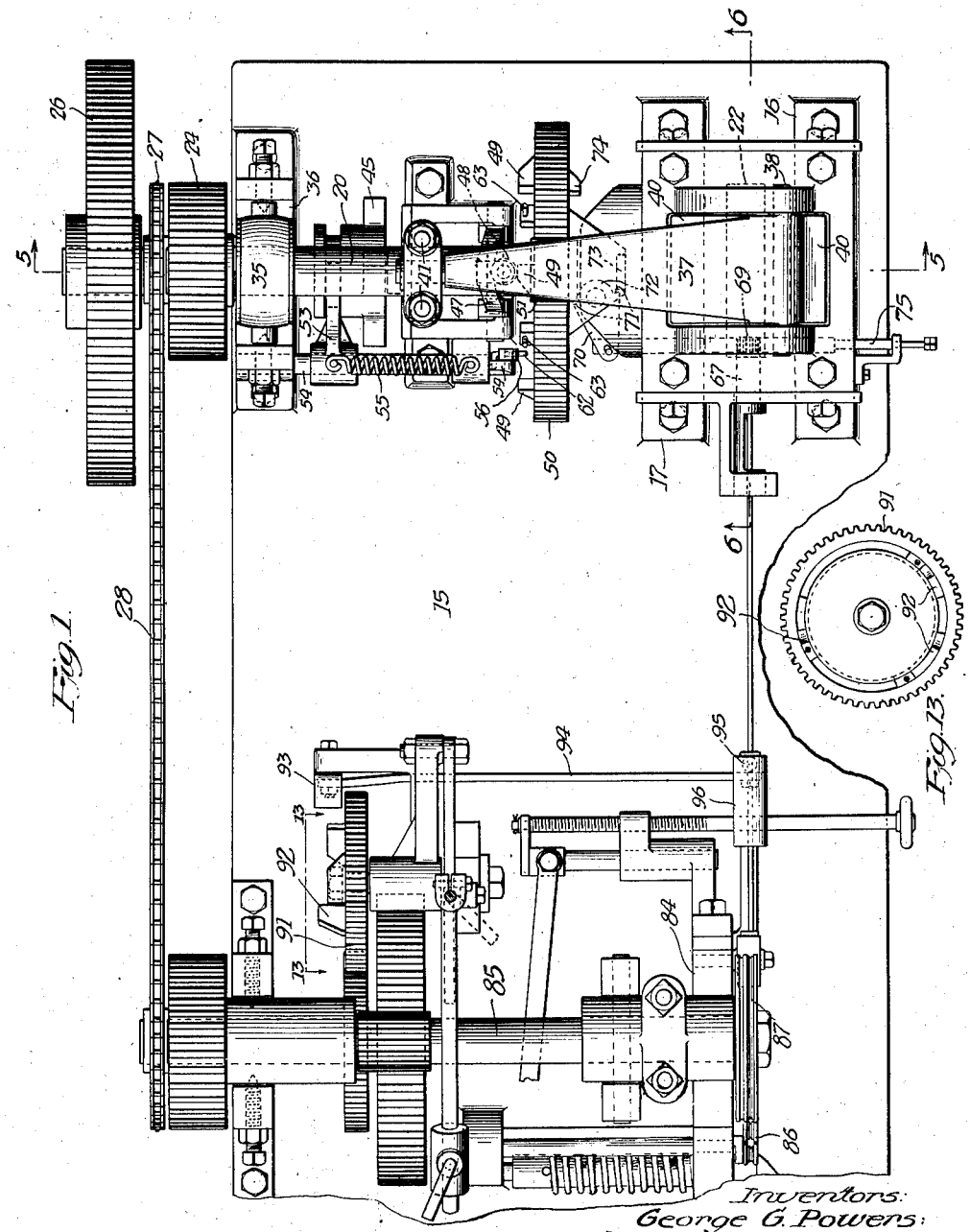
Fig. 1 is a plan view of an assembly of a rolling machine and a coiler constructed in accordance with our invention.

In the drawings we have shown the two machines, that is the roller and a coiler mounted on a base 15 suitably secured thereto in properly spaced relation.

The roller includes a pair of uprights 16, 17 comprising housings within which the roll bearings 18, 19 are mounted. The shafts 20, 21 carrying the rolls 22, 23 are both driven through the pinions 24, 25, the latter being mounted on the power shaft, that is driven by the gear 26. A sprocket wheel 27 provides for a chain drive through the chain 28 of a coiler later to be described.

The rolls 22, 23 are each provided with passages 29, 30 connected by means of pipes 31, 32 to a water supply the water being conducted through the pipes 31, 32 and discharged through the outlets 33, 34 for the purpose of dissipating the heat of rolling.

The roll 22 including the shaft 20 and the bearings 18 are vertically movable, the bearing 35 being mounted for oscillation in the upright 36. Inasmuch as the vertical movement of the roll is comparatively slight, the engagement of the pinions 24, 25 is not disturbed thereby. The roll and associated parts are normally maintained in an elevated position by means of a leaf spring not shown, and is lowered or brought closer to the fixed roll by means of the arm 37 fulcrumed at 38 on a portion of the uprights 16, 17 and carrying a cam surface 39. This cam engages a corresponding cam on the upper edge of a compression block 40 fitted in a top opening in the uprights and bearing against the top surface of the roll bearings 18. It will be seen that as the arm 37 is pulled downward the cam surface 39 tends to depress the roll 22. This downward movement is effected by means of the connecting rods 41, connected to a block 42 that is pressed upwardly by means of the spring 43. This block carries a roller 44 adapted to be engaged by a cam 45 that is slidably mounted on the shaft 21. When the cam 45 is positioned to register with the roller 44, the block and the connecting rods and arm 37 are forced downwardly, and while in a downward position, the latch 46 is moved laterally to overlie the block and lock it in lowered position. The latch is moved by means of a rocker 47 carrying a roller 48 adapted to be swung by means of a cam 49 on the face of the idler gear 50 mounted on the shaft 21. This idler is rotated by means of the pinion 51 cut on the shaft 20. Thus the roll is held in its downward or rolling position as long as the latch 46 serves to hold the block in its lowered position.

The movement of the cam wheel 45 into or out of a position of register with the roll 44 is brought about by the mechanism as shown in Figs. 7 and 5. The cam is mounted on a key 52 in the shaft 21, and the collar of the cam 45 is engaged by a yoke 53 carried on a slide bar 54, a spring 55 tending to pull the cam into register with the roller. A roller 56 mounted on the end of the slide bar 54 is in position to be engaged by a cam 57 on the cam gear 50, whereby the slide is moved to the left as viewed in Fig. 7, until the notch 58 on the underside of the slide bar is engaged by the dog 59. This dog is mounted on a lever 60 pivoted at 61, having an overlying end 62 adapted to be engaged by one of the pins 63, carried by the cam gear.

As the cam gear 50 rotates a pin 63 contacts the end 62, disengages the dog 59 and permits the spring 55 to pull the cam 45 into a position above the roller 44. Continued rotation of the shaft 21 will then cause the cam to exert pressure to lower the roll 22 and it will continue in this position until the cam 57 contacts the roller 56 and pushes the cam 45 out of operative engagement with the roller 44. This permits the spring 43 to raise the block, connecting rods and arm and to raise the roll 22; this assumes the withdraw of the latch 46 by the arm 47.

The face of the cam gear 50 is shown in Fig. 8, the face being provided with grooves 64, 65 and within which the respective cams 49, 57 may be mounted at any desired point in order to produce any specified spring.

Figure 3:
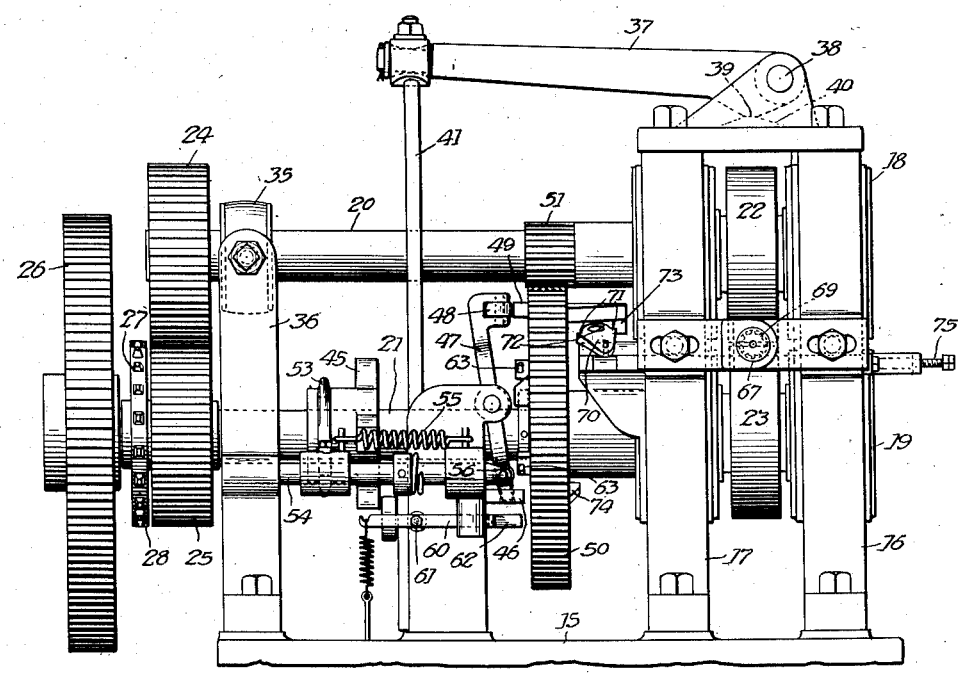
Figs. 3 and 4 are views taken at right angles to that of Fig. 2 the views being taken on the line 3—3, 4—4 of Fig. 2.

In order to produce continuous sections of flattened wire with the flat portions in different planes, it is necessary, in this machine to twist the wire, and this is accomplished by means of the mechanism best shown in Figs. 6, 3 and 9. As shown in Fig. 6 the wire indicated at A is being fed into the rolls in round cross section. The flattened wire as indicated at B enters the guide, best shown in Fig. 11, occupying the horizontal guideway. This guide is in the form of a gear 66 having an extended body 67 that is held in a sleeve bearing 68 carried by the uprights. The gear 66 is engaged by a rack 69 slidable in suitable ways and operated by the mechanism best shown in Fig. 9; that is, the end of the rack is engaged by a finger 70 pivoted at 71 on a stationary portion of the housing and having a projection 72 adapted to be contacted by a cam 73 carried on the opposite face of the gear cam 50. Movement of the rack in the opposite or reverse direction is accomplished by a cam 74 located at the appropriate point on the gear cam 50. An adjustable screw 75 (Fig. 1) is provided for limiting the throw of the rack.

Thus it will be seen that at the appropriate or predetermined time the wire that has been flattened in the rolls will be twisted or turned over ninety degrees and it has been found in the practice that this can best be done when the rolls are separated and the wire is not being held at any point back to the reel. This avoids putting any torsional stress in the wire after it has been flattened; thus it has been found to be desirable to provide a short length of round wire between adjacent sections of flat wire in different planes, the length of the round wire section being wholly a matter of choice, and depending upon the adjustment of the various cams. In some instances we may wish to make a spring such as shown in Fig. 12 in which the upper end 76 is composed of flat wire in a horizontal plane and with a round wire tying end 77. The portion 78 just beneath the head is likewise composed of wire of the same section whereas the part 79 is round wire, this part intervening between the first-mentioned section and the flat wire section 80 arranged in a vertical plane. The next section 81 is of rather extended length and is composed entirely of round wire, while the bottom section 82 is of flat wire in a vertical plane, the spring terminating in a round wire tying end 83. The spring illustrated contains all the different forms in which a spring is likely to be constructed, being flat wire in horizontal and vertical planes, a short intervening length of round wire and another intervening length of round wire and round wire tying ends.

Figure 2:
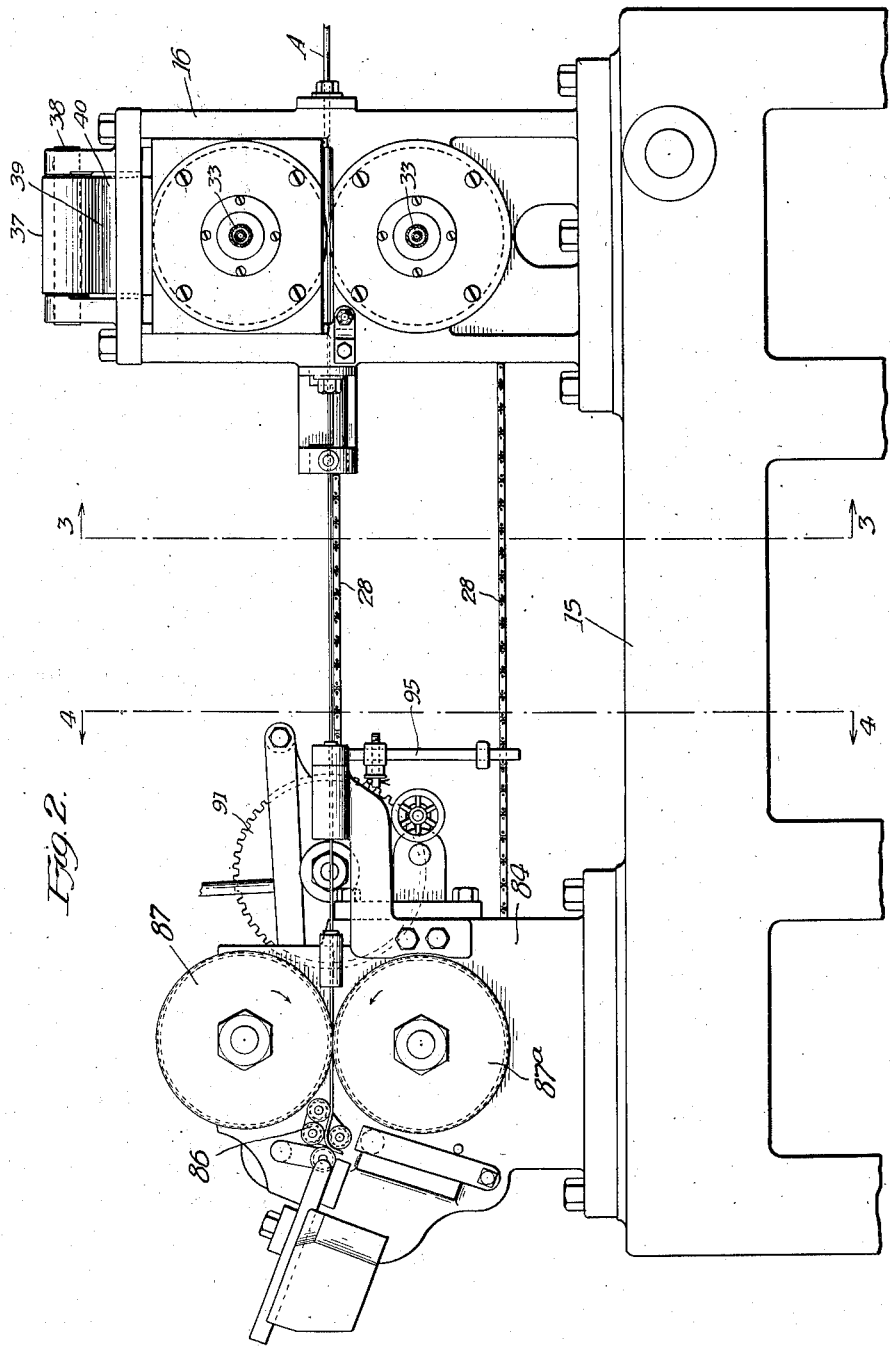
Fig. 2 is a side elevation of the construction shown in Fig. 1.
Figure 4:
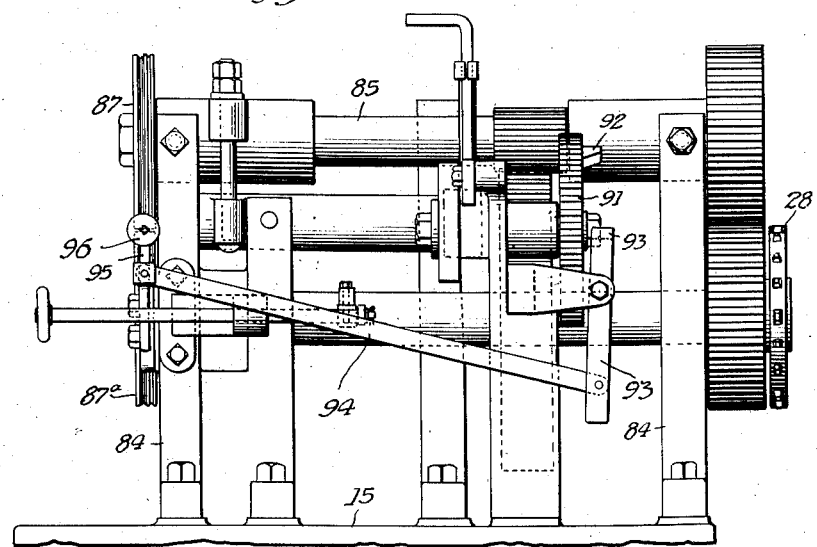

However, the rolling machine merely delivers the rolled wire in a continuous, straight section, and in order to form the spring, the wire must be delivered to a coiler. The coiler is best shown in Figs. 1, 2 and 4 and is of standard construction except for certain modifications that have been made therein in order to adapt it to the coiling of a flat wire spring. The coiler is mounted on the base 15, the uprights or frame 84 carrying bearings for a shaft 85 driven by means of the chain 28. The details of the coiler rollers 86 and the various cams for producing a spring of a desired contour will not be discussed in detail. However, in order to adapt the coiler to handling a spring composed of flat wire in two different planes with intervening round wire sections, we provide the feed rolls 87, 87a, the peripheral construction of which is best shown in Fig. 10, that is to say, the cruciform outline provides a vertical guideway 88, a horizontal guideway 89, and a provision in the center at 90 for round wire. However, in order to make certain the proper register of the flat wire in different planes with the grooves in the feed rolls, we provide the feeder mechanism or adjuster, best shown in Figs. 1, 2, 4 and 13. In Fig. 1, we show a suitable gear 91 having cams 92 adjustably mounted on the face thereof, as best shown in Fig. 13. These cams engage a rocker 93 best shown in Fig. 4 which is connected by means of a rod 94 to an arm 95, the connection being adjustable vertically to provide for more or less throw of the arm 95 as required. The arm 95 is connected to a guide sleeve 96 having a cruciform guideway and pivoted for rotation by the arm. Depending upon the length of the round section between adjacent flat sections in the different planes, the wire in the space between the two machines will be likely to be presented to the guide sleeve 96 in a diagonal position; in other words, with the flat section in such angular position that it would not accurately register with the required vertical or horizontal guideway in the feed rolls. The function of the mechanism just described is to position the guideway in the sleeve 96 according to the position of the wire as it approaches the coiler and then to shift its angular position so that it accurately registers with one or the other of the grooves in the feed rolls 87, 87a. When running springs having a fixed length of round and flat, the adjustment of the parts will not be changed as the wire will always approach the coiler in the same position, the adjustment being provided in order to turn out springs of different construction, if desired.

The wire after leaving the feed rolls of the coiler is operated on in the usual manner to produce the required spring, the machines being co-ordinated so that a spring is produced having the flats and rounds in the required relation.

Attention is called to the fact that while the flattening rolls remain in the same plane at all times, yet the wire is rotated 90 degrees, as predetermined, in order to produce a structure in which the planes of the flattened wire lie at right angles. While we do not concede it is impossible to twist the wire after rolling in order to produce the required angularity of the flats, yet we have found it to be more practical to rotate the wire while it is free of the rolls, the quarter turn taking place in the length of wire extending from the coiler back to the reel. Thus, there is a very slight torsion in any limited length of the wire. If the length of wire extending from the coiler all the way back to the reel is free when the rolls are next brought together, the rolling will take place on a length of wire in which there is practically no torsional stress. Furthermore, the twisting or turning device is so arranged that a 90° turn in one instance is compensated for by the next 90° turn which is made in the reverse direction. Thus after each two turns the wire is in its original position. This is accomplished by the use of the cruciform guideway best shown in Fig. 11, having gear teeth on its periphery and operated by the rack. Rotation through 90° in one direcion serves to present a new flat guideway, while rotation reversely through 90° serves to present the flat guideway that was first presented to the wire. Other means may be devised for twisting the wire as it is in motion and such means may be to operate satisfactorily, but as stated, we have found the described method to be quite satisfactory in the production of a spring blank adapted to be fed to the coiler with certainty.

A condensed statement of operation is as follows:

A wire, indicated at A in Fig. 2 is delivered from a reel or other source of supply. The wire is preferably of the character known as Premier wire, which is drawn from a special steel alloy adapting it for spring use. It has a Rockwell hardness of approximately 24, and is delivered cold to the flattening rolls 22, 23. Assuming that the cam 45 has acted through the roller 44, connecting rods 42 and arm 37 to lower the upper roll 22 into the desired close relation to the roll 23, the wire is flattened, or cold rolled as it passes through the rolls. This cold rolling serves to change the characteristics of the metal increasing the density thereof and giving it a Rockwell hardness of approximately 39. Consequently this serves to greatly increase the resiliency of the subsequently formed spring and at the same time to lessen the ductility of the wire and to render difficult if not impossible the formation of any sharp bends therein such as occur when a terminal portion of the wire is used as a tie. This point will be discussed hereinafter.

As the flattened wire indicated at B in Fig. 6 leaves the rolls it enters one of the two guideways in the cruciform guide 66 and thereafter passes from the rolling to the coiling machine, first entering the guide 95 and then one of the guideways in the cruciform pass 90 in the feed rolls 87, 87a. Whether the flattened wire is fed to these rolls with the flat in a horizontal or vertical plane is determined by the action of the twisters on the rolling machine and the coiler. The former, consisting of the parts 69 to 73 inclusive serves to effect a 90 degree turn of the rolled wire, the timing being such that this turning action takes place only after the flattening rolls have been separated; thus the turning of the wire extends back toward the reel. However, any torsion placed in the wire is relieved at the next actuation of the twister which will be to the same extent as before but in a reverse direction.

In order to insure the correct feeding of the twisted length of wire into the coiler feed rolls 87, 87a we provide the supplemental twisting mechanism on the coiler, best shown in Figs. 1 and 4. Control of the cruciform guideway 96, together with the extent of rotation is effected by the parts 92 to 95 inclusive.

After leaving the feed rolls in the coiler, the wire in the predetermined plane is coiled by means of the mechanism 86 of well known form.

Assuming that a spring such as shown in Fig. 12 is to be produced, the various cams on the rolling machine are set to flatten the wire in the portions 76, 78 and 82 and the twister is set to cause the portion 82 to be produced in a plane at right angles to the remaining flat portions, the remaining portions of the wire including the ends 77 and 83 remaining in the original condition of the wire. This permits the ends which are relatively ductile to be tied around the adjacent coil. The intermediate portion, consisting of the closely spaced turns—all of which are inactive so far as the resiliency of the spring is concerned—is likewise composed of round wire which will facilitate the engagement of the cross connecting members of a double or triple deck spring.

When the rolling machine has been set to produce the requisite length of wire, flattened as required, the coiler is set to produce the predetermined spring and the two machines are co-ordinated, being operatively connected by means of the drive chain 28. We have described the operation of rolling and coiling the wire into a spring as a continuous and co-ordinated process as we are not convinced that a spring as described could be produced commercially in any other manner; that is, for example, by rolling the wire in one operation, reeling it, and then in a later operation coiling it; or by rolling the wire as required, cutting it in lengths and then feeding the cut sections to the coiler. However, it may be found to be practical to operate in some manner other than as a continuous process and we do not wish to be limited to a continuous process except where so indicated in the claims.

The described machine and process may be used to produce any of a multitude of forms of springs; for example, we may wish to produce a spring for mattress use, composed of relatively small diameter wire, in which the body portion may be composed of flattened wire in one or more planes and the end coils may be composed of round wire to facilitate forming and tying. By proper disposition of the flat portions we can provide for increased resistance to the various expected stresses and at the same time greatly increase the life of the spring due to the greater resiliency as the result of cold rolling. This is accomplished without reducing the capacity of the wire in the end coils for forming and tying.

We claim:

1. In combination, means for cold rolling spring wire to change its cross section from round to flat, means for causing adjacent portions of said flat wire to occupy relatively angular planes, a coiler for said spring wire, and means for coordinating the coiler to the roller whereby to cause the angularly disposed flat sections to occupy predetermined positions in the finished spring.

2. In combination, a pair of rolls, means for continuously feeding a round wire to said rolls and flattening a portion of a length of wire less than that required for a predetermined spring, means for separating the rolls to release the wire therefrom, means for rotating the wire ninety degrees while so released, and means for restoring the rolls to flattening position and rolling a second section of said wire to provide a flat portion disposed in an angular plane relative to said first section.

3. In combination, a pair of rolls, means for continuously feeding a round wire to said rolls and flattening a portion of a length of wire less than that required for a predetermined spring, means for separating the rolls while feeding the wire therethrough, whereby to provide a length of wire partly flat and partly round in cross section, a coiler for forming a spring, and means coordinating the coiler to the flattening and releasing means whereby to provide a tying end of round wire on each spring.

4. In a combined machine for cold rolling and coiling a length of wire into a spring, the combination of a pair of rolls, automatic means to position the rolls whereby to flatten a wire for a predetermined length then to release the wire to permit its being turned on its long axis and then to reposition the rolls for flattening the wire in a relatively angular plane, and means for coordinating the operation of the coiling element with the rolling element to produce, in a continuous operation, a spring with the flats and rounds of the wire in predetermined portions.

5. In a cold rolling machine for spring wire, the combination of a pair of rolls, means for raising and lowering one of said rolls to effect flattening or free passage of the wire, and means for rotating the wire on its long axis while it is free of the rolls whereby the subsequent closing of the rolls will result in flattening of the wire in a different plane.

6. In a machine for flattening separated portions of a moving strand of wire, the combination of a pair of rolls and means including a cam, adjustable as to its position, for relatively changing the spacing of said rolls, whereby to cause a wire to be flattened as it passes between the rolls or to be free of the rolls as it passes therethrough.

7. In a machine for flattening separated portions of a moving strand of wire, the combination of a pair of rolls and means including a cam, adjustable as to its position, for relatively changing the spacing of said rolls, whereby to cause a wire to be flattened as it passes between the rolls or to be free of the rolls as it passes therethrough, and means synchronized with said roll spacing means for turning said wire on its long axis while the said wire is free of the rolls.

8. In a machine for flattening separated portions of a moving strand of wire, the combination of a pair of rolls and means including a cam, adjustable as to its position, for relatively changing the spacing of said rolls, whereby to cause a wire to be flattened as it passes between the rolls or to be free of the rolls as it passes therethrough, a wire guide at the outlet of the wire from the rolls said guide being cross shaped in contour, whereby to receive a flattened wire in either of two positions of the guide and to receive a round wire in any position.

9. In a machine for flattening separated portions of a moving strand of wire, the combination of a pair of rolls and means including a cam, adjustable as to its position, for relatively changing the spacing of said rolls, whereby to cause a wire to be flattened as it passes between the rolls or to be free of the rolls as it passes therethrough, and a guide for the wire after it passes said rolls, said guide being cross shaped in transverse outline, means for rotating said guide ninety degrees and for returning the guide to initial position in a subsequent operation, the guide presenting an opening for a flat wire in either of its two positions.

10. In a machine for flattening separated portions of a strand of round wire, the combination of a pair of rolls, means for changing the spacing of said rolls whereby to cause a wire to be flattened as it passes through the rolls or to remain in its round condition, means acting on the wire after it passes the rolls for turning the wire through at least ninety degrees on its long axis, a coiler including a pair of feed rolls having a pass of cruciform outline adapted to receive a flattened wire in two angularly disposed positions.

11. In a machine for flattening separated portions of a strand of round wire, the combination of a pair of rolls, means for changing the spacing of said rolls whereby to cause a wire to be flattened as it passes through the rolls or to remain in its round condition, means acting on the wire after it passes the rolls for turning the wire through at least ninety degrees on its long axis, a coiler including a pair of feed rolls having a pass of cruciform outline adapted to receive a flattened wire in two angularly disposed positions, and means operating in timed relation to the wire flattening means for turning and guiding the wire into the appropriate portion of the cruciform pass in the coiler feed rolls.

12. In a machine for producing a finished spring composed of flattened wire in at least two planes by a continuous process, the combination of a pair of rolls for flattening said wire, means for twisting the flattened wire through at least ninety degrees without stopping the travel of the wire, and a coiler having a pair of feed rolls adapted to receive a flattened wire in either of two planes.

13. In a machine for producing a finished spring composed of flattened wire in at least two planes by a continuous process, the combination of a pair of rolls for flattening said wire, means for twisting the flattened wire through at least ninety degrees without stopping the travel of the wire, a coiler having a pair of feed rolls adapted to receive a flattened wire in either of two planes, and means between the flattening rolls and the coiler for guiding and feeding the flattened wire into the coiler feed rolls in the appropriate plane.

14. In a machine for producing a finished spring composed of flattened wire in at least two planes by a continuous process, the combination of a pair of rolls for flattening separated portions of said wire, means for twisting the flattened wire through at least ninety degrees without stopping the travel of the wire, and a coiler having a pair of feed rolls adapted to receive a flattened wire in either of two planes.

15. In combination, a pair of rolls, means for continuously feeding a round wire to said rolls and flattening a portion of a length of wire less than that required for a predetermined spring, means for interrupting the rolling action while feeding the wire therethrough, whereby to provide a length or wire partly flat and partly round in cross section, a coiler for forming a spring, and means operated by the coiler for forming a spring from said length of wire in which the flattened portion constitutes at least a part of the active portion of the spring and said round wire portion constitutes at least a part of the inactive portion of the spring.

16. The method of making springs which consists in continuously feeding a drawn round wire that is sufficiently ductile to permit of knotting or tying, then flattening by cold rolling a portion only of the wire that is to constitute the spring, whereby to increase the resiliency of said cold rolled portion, and then coiling said wire into springs, in which a portion of each spring is composed of cold rolled resilient wire and another portion of ductile and less resilient wire.

17. The method of making springs which consists in continuously feeding a drawn round wire that is sufficiently ductile to permit of tying or forming thereof through a pair of rolls, then actuating said rolls to flatten and cold roll a portion of a length of wire less than that required for a predetermined spring and then as a continuation of said rolling process, coiling said wire into a spring with the cold rolled portion constituting an active part of the spring and with a round wire portion constituting a ductile and less resilient portion of the spring.

18. The method of making springs which consists in continuously feeding a drawn round wire that is sufficiently ductile to permit of tying or forming thereof through a pair of rolls, then actuating said rolls to flatten and cold roll a portion of a length of wire less than that required for a predetermined spring, then separating the rolls to release the wire therefrom, then rotating the wire while so released, then restoring the rolls to flattening position and rolling a second section of said wire to provide a flattened portion disposed in an angular plane relative to said first section and then coiling said wire into a spring in which the flattened wire occupies different angular planes in said spring.

19. The method of making springs which consists in providing a drawn round wire that is sufficiently ductile to permit of knotting, tying or forming thereof, then flattening by cold rolling that portion of the wire that is to form at least a portion of the active part of the spring whereby to increase the resiliency of said active portion and then as a continuation of the rolling process coiling said wire into a spring with a terminal portion thereof composed of round and ductile wire.

GEORGE G. POWERS.
CLARENCE A. RHINEVAULT.